United States Patent [19]

Coughlin

[11] 4,336,765

[45] Jun. 29, 1982

[54] VACUUM WORK PIECE HOLDER

[76] Inventor: Vincent D. Coughlin, Box 608, R.D. #1, Oxford, N.J. 08901

[21] Appl. No.: 272,917

[22] Filed: Jun. 12, 1981

[51] Int. Cl.$^3$ .................... C23C 13/08; G01N 33/48
[52] U.S. Cl. .......................................... 118/50; 118/56; 118/501; 248/362; 248/363; 269/21; 427/2; 424/3
[58] Field of Search ................. 422/104; 118/50, 56, 118/501; 248/362, 363; 269/21; 427/2; 424/3

[56] References Cited

U.S. PATENT DOCUMENTS

| | | | |
|---|---|---|---|
| 1,210,074 | 12/1916 | Jenkins | 118/56 |
| 2,198,765 | 4/1940 | Featherstone | 248/363 |
| 2,274,729 | 3/1942 | Owen | 118/501 |
| 3,853,092 | 12/1974 | Amos | 118/56 |
| 3,987,933 | 10/1976 | Ishammer | 248/363 |

Primary Examiner—Sam Silverberg
Attorney, Agent, or Firm—Ruth Moyerman

[57] ABSTRACT

A vacuum operated work piece holder and method are disclosed for holding slides and the like during subsequent work operations. In the apparatus of this invention, an elongated and generally cylindrical vacuum chamber containing a plurality of ports is provided. When a vacuum is drawn through the chamber, biological laboratory slides or the like may be held in place on the port to enable gram staining and washing operations to be carried on in sequence. Multiple chambers may be used and each chamber is preferably mounted so as to be rotatable to allow the operator to rotate the chamber to aid in draining the wash water.

5 Claims, 5 Drawing Figures

VACUUM WORK PIECE HOLDER

BACKGROUND OF THE INVENTION

1. Field of the Invention

This invention relates to chemical analysis, and more particularly to apparatus and a method for securing slides during bacteriological and hematological gram stain analysis.

2. Description of the Prior Art

The Gram stain is one of the most widely used and important stains in bacteriology. Originally devised by Hans Christian Gram (Denmark, 1884), it permits the differentiation of two groups of organisms; one group called gram-positive, the other gram-negative. With the Gram-staining method, the gram-positive organisms stain purple, whereas gram-negative organisms stain red. The Gram reaction is correlated with certain basic chemical and physiologic properties of bacteria, and their identification is greatly facilitated by its use.

According to Salton, the color differentiation is due to the formation of a crystal violet-iodine complex "trapped" in the organism, probably by a barrier consisting of the dehydrated and mordanted cell wall. In Gram-positive cells, the barrier becomes impenetrable after treatment with mordant and iodine; in gram-negative cells, the barrier is more penetrable and the solvent extracts the iodine—crystal violet complex. The molecular basis of the reaction is not known; however, in addition to aiding in recognition and identification of organisms, the gram-staining properties seem to denote some very fundamental biologic differences between the "gram-positives" and "gram-negatives" (differential susceptibility to various antibiotics, to lysozyme, etc.). Because of the danger of overstaining or overdecolorizing, it is recommended that at least once a day known gram-negative and gram-positive organisms be stained at the same time as the cultures that are being examined. The following gram-staining technique is the present recommended method.

Hucker modification:
1. Fix the slide in the flame and allow to cool
2. Stain with Hucker crystal violet (S-5) 60 sec.
3. Wash with tap water
4. Stain with Gram's iodine (S-9) 1 min.
5. Wash with tap water
6. Decolorize with 95% alcohol until no further violet comes away (20–30 sec.)
7. Wash thoroughly with distilled water
8. Counterstain with 0.25% safranin (S-12) 20 sec.
9. Wash with tap water
10. Dry in air and examine Thus, it may be seen that present methods require tilting or dipping the glass slide so that it may be washed free of excess staining solution in order to be able to apply the next staining solution without diluting the previous dye. Because of the necessity for frequent handling of the glass slide, the process is cumbersome and awkward, often causing stains (blue, red, purple) of the fingers and thumbs. These stains are inevitably transferred to lab coats and uniforms worn by laboratory personnel.

One prior art device is known which holds microscope slides stationary during routine and special slide staining. This device employs so-called suction cups and has not proven to be satisfactory for a variety of reasons. Slides are difficult to affix to the cups and when once affixed, are subject to both inadvertent releasing or the opposite, inability to be released, leading to lost time and contamination. Also, the rubberized surface of the cups wears poorly as well. Lastly, the device is clumsy to use and, while trying to attach or detach a slide, there is danger that the glass will break and the operator be injured.

There is therefore a need for an apparatus which would be suitable for securing slides or the like work piece to enable a succession of operations to be performed on the work piece without manual interface for contamination.

SUMMARY OF THE INVENTION

The aforementioned prior art problems are solved by the vacuum slide holder and method of this invention in which slides or similar work pieces are vacuum sealed to a holder during work operations. In the apparatus of this invention, an elongated and generally cylindrical vacuum chamber is provided. The vacuum chamber includes a plurality of ports on which slides may be placed. When a vacuum is drawn through the chamber, the slides are thus secured. The device may contain one or multiple vacuum chambers. The vacuum chambers are preferably mounted within a tray to conveniently receive wash water from the gram stain or similar operation. Each chamber is also preferably mounted so as to be rotatable and handle means are provided to allow the operator to rotate the chamber to aid in draining wash water.

In the method of this invention, slides or the like work pieces are secured for successive operations and washings without manual interface by reducing pressure within a multiport rotatable vacuum chamber and placing the work piece over a port whereby the work piece is secured solely by the external atmospheric pressure whenever the vacuum is induced within the chamber.

It is therefore an object of this invention to provide an apparatus for handling of multiple slides during successive operations and washings.

It is yet another object of this invention to provide a multi-chamber vacuum apparatus to expedite biological and hematological gram stain analysis without contamination of the plate.

It is still another object of this invention to provide the aforementioned apparatus and method so that an operator may work without damage to their person or clothing.

It is yet another object of this invention to provide a multi-purpose work piece holder suitable for those small laboratory operations, and one which is readily expandable to larger scale needs.

It is still another object of this invention to provide the aforesaid apparatus and method so as to be inexpensive to produce, simple to operate, and versatile in application.

These and other objects will be more readily ascertainable to one skilled in the art from a consideration of the following figures and exemplary embodiments.

BRIEF DESCRIPTION OF THE DRAWING(S)

DETAILED DESCRIPTION OF THE PREFERRED EMBODIMENT(S)

Figure 1:
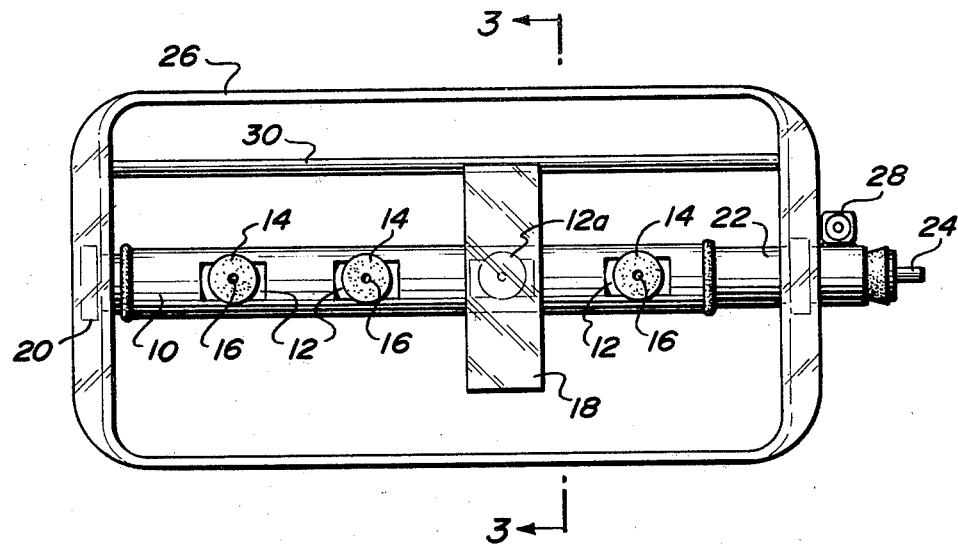
FIG. 1 illustrates a top view of the preferred embodiment of this invention showing a slide as a work piece in place on the apparatus.

Referring now to the drawings, and more particularly to FIG. 1, vacuum chamber 10 is shown. Vacuum chamber 10 includes, in the illustration shown in FIG. 1, four vacuum ports 12. Ports 12 include in each instance support 14 and opening 16. Support 14 provides the resting place for the work piece as is shown at port 12A which is the port upon which slide 18 is mounted. Vacuum chamber 10 includes two ends, one end 20 is sealed and the other end 22 terminates in connector 24 which is intended to be connected to a vacuum pump (not shown). Vacuum chamber ends 20 and 22 are journaled within tray 26. Also connected to vacuum chamber 10 near end 22 is handle means 28 which is illustrated in more detail in FIG. 2.

FIG. 1 also includes optional stop means 30, whose purpose is to arrest the rotational movement of slide 18 to prevent the slide from accidentally being turned an excess of amount which might result in the organisms or materials with which they are being treated running excessively or dipping into wash water which might be in tray 26.

Figure 2:
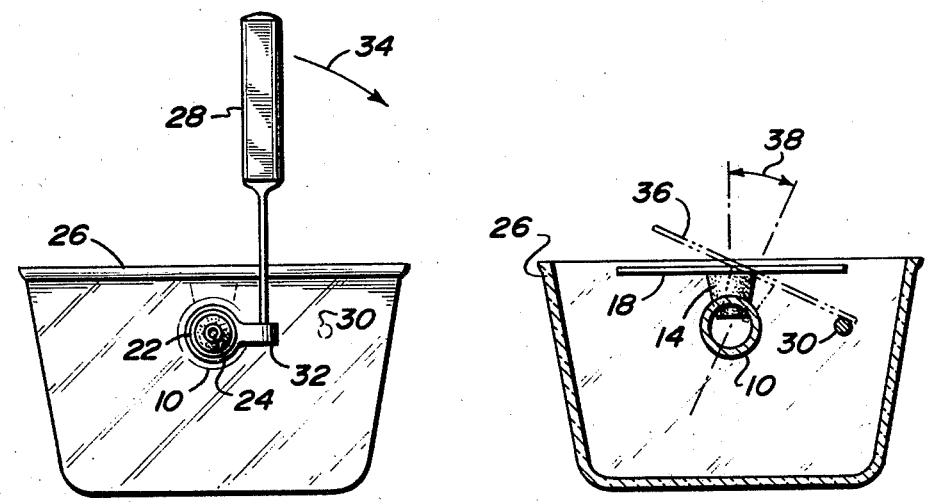
FIG. 2 shows a side elevation of the preferred embodiment including rotatable handle means.

Referring now to FIG. 2, vacuum chamber 10 is shown in end section to better illustrate handle means 28. It may be seen that handle means 28 is connected to chamber 10 at end 22 by moment arm 32 and that when handle means 28 is moved in the direction illustrated by arrow 34, such movement causes the rotation of vacuum chamber 10 through moment arm 32.

Figure 3:
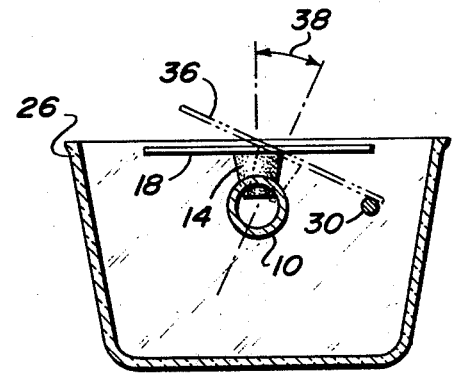
FIG. 3 shows a cross section taken on lines 3—3 of FIG. 1 and including, in phantom, the slide in rotation.

Referring now to FIG. 3, the aforementioned movement is illustrated. In FIG. 3, slide 18 is shown in the same horizontal position as that illustrated in FIG. 1. The potential movement range of slide 18 is illustrated by slide 36 (shown in phantom resting against stop means 30). The total angle of rotation available for slide 18 is illustrated at arrow 38.

Figure 4:
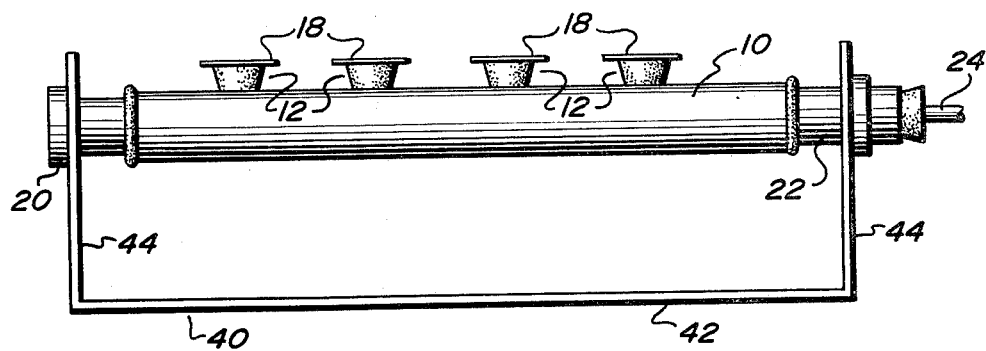
FIG. 4 illustrates a side view of the apparatus of this invention utilizing a support means in place of a tray.

Referring now to FIG. 4, an alternate embodiment of the device of this invention is illustrated wherein tray 26 is eliminated and replaced by the more general support means 40, shown in FIG. 4 as including base 42 and side arms 44. In some applications, it may be desirable to have chamber 10 mounted merely in a support means as opposed to a tray, and the apparatus shown in FIG. 4 may be operated by setting it in a sink, for example. Another application would be in a situation where the work pieces would not require washing and, therefore, tray 26 is not needed.

Figure 5:
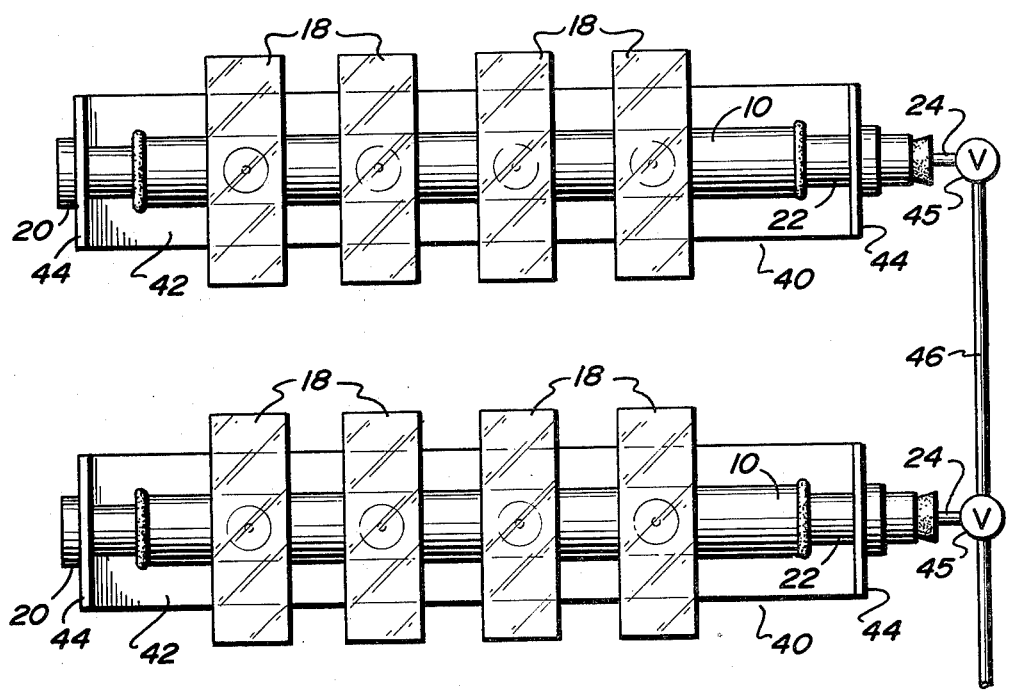
FIG. 5 shows a top view of a multi-chamber embodiment of the vacuum holder of this invention.

Referring now to FIG. 5, a multi-chamber apparatus is illustrated. In the example shown in FIG. 5, two vacuum chambers 10 are shown connected through end connectors 24 by valve means 45 to a single vacuum line 46.

In the method of this invention an operator, by pump or other means, evacuates vacuum chamber 10 following which slides or other work pieces may be rested on vacuum ports 12. Unused ports may have to be capped in their dimension is overly large, but generally it is not necessary since the loss of vacuum is kept slight by having only as large a port as is necessary to hold the slide during the tilting or rotating of the chamber. After placement of slides 18, work may be done on slides 18, including washings with removal of excess liquid by turning handle 28 and thereby rotating the chamber.

There are many variations which may be practiced within the scope of this invention. For example, the number of vacuum ports 12 which are available within any single vacuum chamber 10 is determined only by the capacity of the individual vacuum pump one might wish to employ with this system. Likewise, the total number of vacuum chambers which may be interconnected by valve means within a single system, as illustrated in FIG. 5, is optional.

The support means 40 illustrated in FIG. 4 is exemplary only and other support means are intended to be included within the scope of this invention whether or not they include base 42 and without regard to the design or configuration of end pieces or side arms 44.

Handle means 28, although illustrated as a single bar connected to a moment arm, is merely one embodiment and any other embodiment for handle means which would perform the function is intended to be included. It should also be noted that handle means 28 is optional and may be eliminated in those applications of the apparatus and method of this invention in which work piece rotation is nonessential.

Vacuum ports 12 are illustrated as including supports 14, but it is entirely possible to design vacuum chamber 10 so that support 14 is either eliminated and the work piece supported directly on the vacuum chamber, or in the alternative, another design for support 14 is utilized.

Having now illustrated and described the apparatus and method of this invention, it is not meant for such description to limit the invention but rather that the invention be limited only by a reasonable interpretation of the appended claims.

What is claimed is:

1. A vacuum work piece holder, suitable for securing slides or the like, comprising:
   (a) at least one elongated and generally cylindrical vacuum chamber including two ends;
   (b) tray means of a length and width sufficient to contain said chamber said tray also including sides which are adapted to rotatably support said chamber above said tray bottom; and,
   (c) a plurality of ports extending generally in a linear path along the long axis of said chamber, and of a cross section sufficient to support a work piece securely thereon by suctional engagement.

2. The holder according to claim 1 including, additionally:
   (e) handle means to control rotation of said chamber.

3. The holder according to claim 2 including, additionally:
   (f) stop means to arrest the rotational movement of said chamber.

4. The holder according to claim 1 wherein said chamber is one of a plurality connected in parallel to a single vacuum source.

5. A vacuum work piece holder, suitable for securing slides or the like, comprising:
   (a) at least one elongated and generally cylindrical vacuum chamber including two ends adapted to be journaled into tray sides;
   (b) a plurality of ports extending generally in a linear path along the long axis of said chamber, and of a dimension sufficient to support a work piece securely thereon by suctional engagement;

(c) tray means of a length and width sufficient to contain said chamber, and with sides which are adapted to support said chamber above the tray bottom;

(d) handle means connected to said chamber whereby said chamber may be rotated; and (e) stop means to arrest the rotational movement of said chamber.

* * * * *